O. A. HOLLIS.
TRACTOR.
APPLICATION FILED MAY 19, 1911. RENEWED JAN. 9, 1913.
1,069,875.   Patented Aug. 12, 1913.
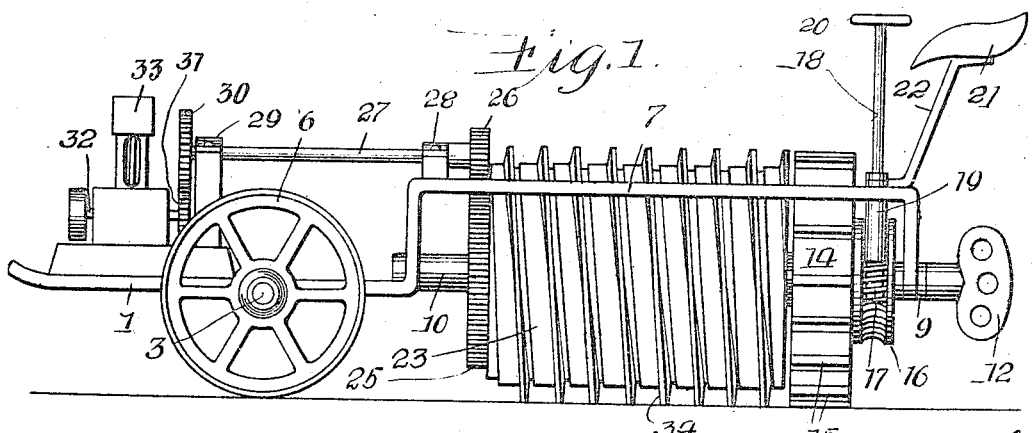
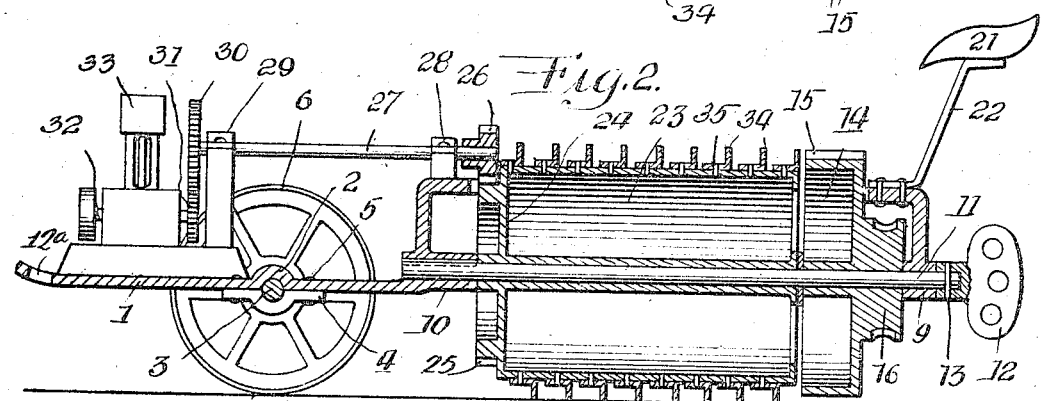
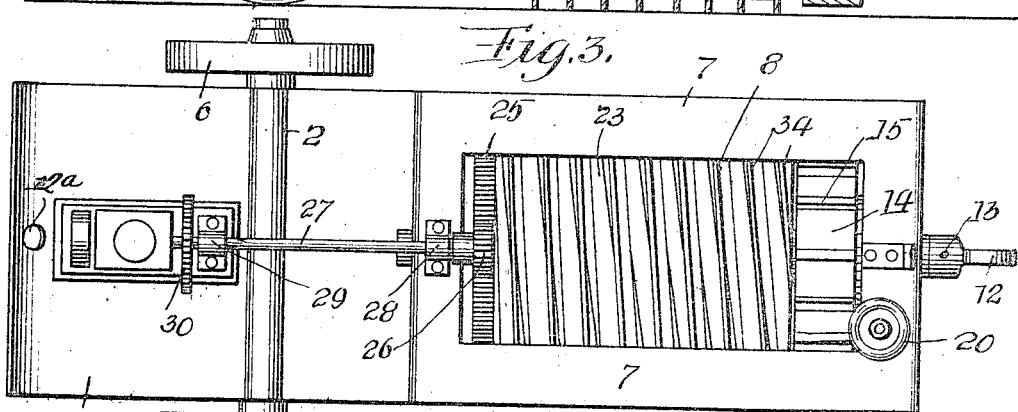
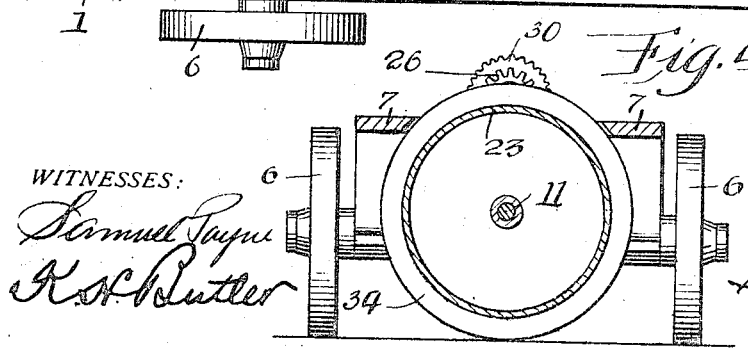
WITNESSES:   INVENTOR.
              O. A. HOLLIS
              ATTORNEYS.

UNITED STATES PATENT OFFICE.

OTIS A. HOLLIS, OF PITTSBURGH, PENNSYLVANIA, ASSIGNOR TO HOLLIS AUTOMATIC TRACTION JACK COMPANY, OF DOVER, DELAWARE, A CORPORATION OF DELAWARE.

TRACTOR.

1,069,875.  Specification of Letters Patent.  Patented Aug. 12, 1913.

Application filed May 19, 1911, Serial No. 628,219.  Renewed January 9, 1913.  Serial No. 741,130.

*To all whom it may concern:*

Be it known that I, OTIS A. HOLLIS, a citizen of the United States, residing at Pittsburgh, in the State of Pennsylvania, have invented a certain new and useful Tractor, of which the following is a specification.

My invention relates to traction machines intended for low speed and great power, such as used for agricultural operations, etc., and particularly for machines which operate by direct engagement with the ground.

The primary objects are to provide a driving mechanism which embeds itself in and engages the ground, for exerting traction, and which by direct application of power economizes fuel; to simplify and strengthen the construction of such a device, and especially to provide a traction machine capable of operating on steep hillsides and in mud or any other kind of soil.

The invention is illustrated in the accompanying drawing wherein—

Figure 1 is a side elevation; Fig. 2 is a longitudinal vertical section; Fig. 3 is a plan view and Fig. 4 is a section through the driving drum and partial elevation.

There have been heretofore machines provided with screws after the manner of the worm gear intended to engage with ice surfaces, etc., but they have not been adapted for tractors for farm use because they were not capable of efficiently engaging the soil and depended for support upon means other than the screw. In my invention the essential element is a worm which buries itself in and operates upon the earth itself. It is not put out of commission by striking mud, nor prevented from operation on steep hillsides, etc., for the earth itself operates essentially as a part of the driving mechanism and the machine adapts itself to proceed in the line of least resistance, considering all conditions of weight, condition of soil and form of surface. Thus in the form of the tractor shown here for illustration, I provide a revolving drum 23, provided with a helical flange 34 adapted to sink in and engage the earth as the drum rotates, and when prevented from rolling laterally by the supplementary drum 14 having longitudinally arranged flanges 15, will move itself forward after the manner of a screw. The two drums 23 and 14 are preferably mounted loosely upon a shaft 11 supported in a frame 1, 7, and the driving drum has at one end a gear 25 meshing with a pinion 26 also mounted in the frame and on a shaft 27 which by means of gears 30 and 31 is driven from the revolving shaft 32 by any convenient form of engine 33. The engine 33 is mounted upon an extension of the main frame 1 and part of its weight is carried by ordinary wheels 6 on a shaft 3 supported by the frame. The principal weight however, ought to be carried by the drum 23.

The operation of the supplementary or guiding drum 14 is accomplished by providing it with a gear 16 engaging a screw 17 on a shaft 18 mounted in the frame 7 and carrying a handwheel 20. A driver's seat may conveniently be mounted as at 21 in proximity to the steering wheel 20 and the engine operated by levers in any convenient and well known way. The two drums 23 and 14 may be of the same structure, but it is generally preferable to have the drum 14 the larger and its vanes enter the earth easily. The coöperation of the two drums directs the machine, which of course can swing about the wheels 6 as a pivot.

It will be observed that in operation the machine may be hooked to a load at either end as by coupling head 12 or by the hole 12ª in the frame plate 1, and by reason of its weight will sink a considerable distance into the earth. The revolution of the helical flanges 34 in the earth will form for themselves a resistance base and push the entire machine forward, the tendency to roll laterally being resisted by the vanes 15 on the coöperating drum 14, and the machine is held in the proper alinement under all conditions by revolving the drum 14 as occasion may require. It will be plain that this tractor will travel through mud quite as well as dry soil, and that it may go in any direction on hillsides since it makes its own channel or path through the earth and automatically takes up a position so as to travel in the line of least resistance. It therefore may be used with advantage for plowing and all forms of heavy hauling where great speed is not required.

Having thus described my invention and illustrated its use, what I claim is the following:

1. A tractor comprising a drum provided with helical flanges and a supplemental drum provided with approximately longitudinal flanges, the two being mounted to coöperate by burying themselves in the earth, substantially as described.

2. The combination with a driving engine and suitable gearing, of a revolving drum having helical flanges to directly engage in the earth, and a supplemental drum with approximately longitudinal flanges mounted in alinement with the helical drum and having means to rotate it at will in order to guide the line of travel of the helical drum.

3. A traction engine comprising a frame, a driving engine, a longitudinal shaft in the frame, a drum revolving on said shaft and driven by said engine and having helical flanges thereon adapted to engage in the earth, and on the same shaft a guiding drum with longitudinally arranged flanges engaging the earth, and a worm gear device for altering the relative position of said supplemental drum, whereby the two drums may travel forward and in controllable directions by direct engagement with the earth as a resistance abutment, and the supplemental drum travels in the path of cylindrical form created by the driving drum in its motion, substantially as described.

In testimony whereof I affix my signature in the presence of two witnesses.

OTIS A. HOLLIS.

Witnesses:
MAX H. SROLOVITZ,
CHRISTINA T. HOOD.